C. E. McCLAY.
PNEUMATIC TIRE.
APPLICATION FILED FEB. 16, 1914.
1,160,424.
Patented Nov. 16, 1915.
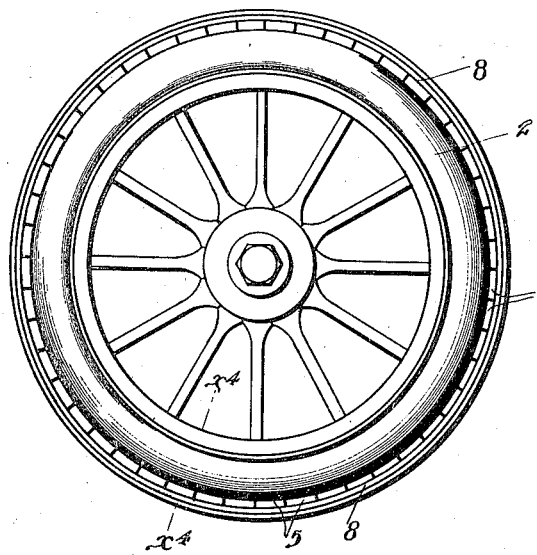
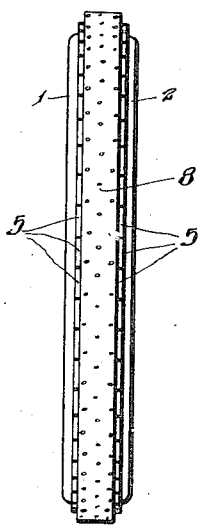
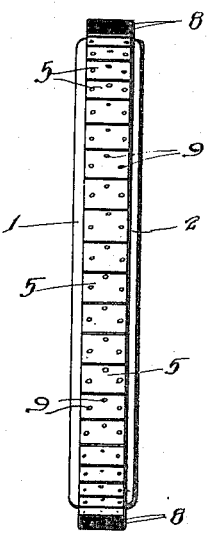
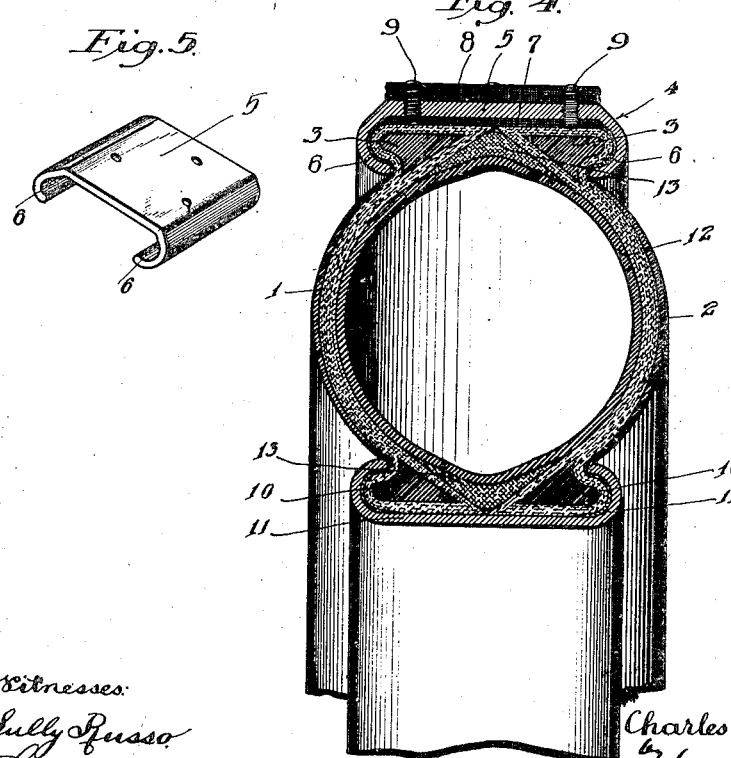
Witnesses:
Sully Russo
Inventor
Charles E. McClay
by
Hans Haerlu
attys.

UNITED STATES PATENT OFFICE.

CHARLES E. McCLAY, OF LOS ANGELES, CALIFORNIA.

PNEUMATIC TIRE.

1,160,424.

Specification of Letters Patent.  Patented Nov. 16, 1915.

Application filed February 16, 1914.  Serial No. 818,916.

*To all whom it may concern:*

Be it known that I, CHARLES E. McCLAY, a citizen of the United States, residing at Los Angeles, in the county of Los Angeles and State of California, have invented a new and useful Pneumatic Tire, of which the following is a specification.

This invention relates to a pneumatic tire, and the object of the invention is to form a tire in two circumferential sections, and to provide a removable outer tread whereby if either section becomes damaged, it may be replaced with another without requiring the replacement of the whole tire, and enabling the tread portion thereof to be renewed when worn.

Referring to the drawings: Figure 1 is a side elevation of a wheel equipped with my improved tire. Fig. 2 is a front elevation of the wheel showing one form of my invention. Fig. 3 is a view similar to Fig. 2 showing the outer tread in section. Fig. 4 is an enlarged cross section taken radially through the tire on line $x^4$—$x^4$, Fig. 1. Fig. 5 is a perspective view of a tread block.

The body of the tire comprises two circumferential sections 1 and 2, which are similar in construction, and are provided at their outer portions with rim securing means consisting in the present embodiment of flanges 3, to which is secured a tread 4, which may consist of a series of segmental blocks 5, shown in detail in Fig. 5, each block 5 having curled rims 6, which fit the flanges 3. The circular band of material is arranged between the blocks 5 and the flanges 3 composed, for example, of some tough asbestos-like substance. Encircling the outside of the tread blocks 5 is one or more layers of some tough asbestos-like substance. The layers 7 and 8 and the blocks 5 are secured together by threaded studs 9, so that as the tread wears down, the threads of the studs will continue to act to hold the outer layers 8 in position.

The inner portions of the sections 1 and 2 may be constructed in any of the desired rim attaching forms, of which there are many well known. For example, they may be provided with flanges 10, which engage the curled edges of the rim 11. Within the tire thus formed is the inner tube 12, and flaps 13 are preferably provided to fit into the spaces between the flanges 3 and flanges 10 to prevent pinching of the inner tube.

When the tire is inflated, all of the parts are firmly locked in position, and the tread cannot come off. When it is desired to move the tread from the tire sections, or to move the tire from the rim, the tire is deflated, which then enables the sections to be disengaged from the flanges of the tread blocks 5 or from the rim 11. Obviously, when the tread becomes worn down, it may be readily detached and a new tread substituted at a comparatively low cost. Likewise, should either the section 1 or 2 become seriously damaged, it may be readily replaced with another at much less cost than for replacing an entire new tire.

What I claim is:

A tire comprising two similar circumferential sections, flanges on the outer longitudinal edges of the sections, segmental nonflexible blocks mounted on the flanges and having inwardly curled edges fitting over and locking with the flanges, a flexible band mounted between and spacing the blocks from the outer surface of the flanges and segmental sections, the outer flexible band mounted upon the outer face of the blocks, said blocks having screw-threaded openings therein, and threaded studs turned through the outer band, openings and inner band.

In testimony whereof, I have hereunto set my hand at Los Angeles, California this 11th day of February, 1914.

CHARLES E. McCLAY.

In presence of—
GEORGE T. HACKLEY,
LORRAINE E. DURROW.